Figure 1:
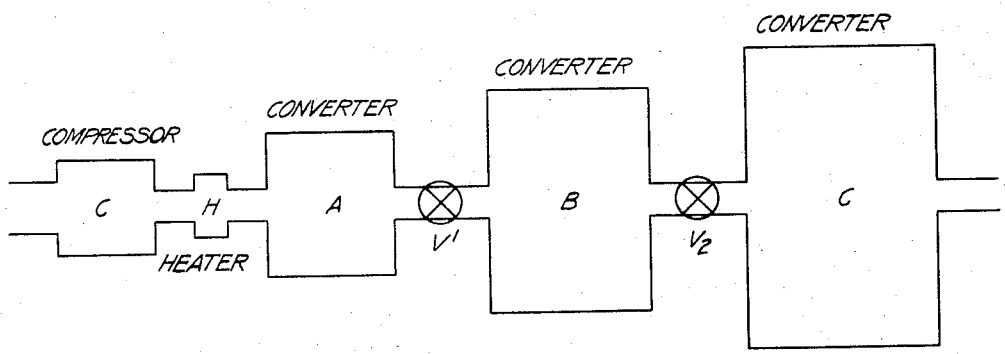

Oct. 18, 1932.  C. B. CLARK  1,883,570
METHOD OF CONDUCTING EXOTHERMIC GASEOUS REACTIONS
Filed Nov. 5, 1926

INVENTOR
CYRIL B. CLARK
BY Forbes Silsby
ATTORNEY

Patented Oct. 18, 1932

1,883,570

UNITED STATES PATENT OFFICE

CYRIL B. CLARK, OF SCARSDALE, NEW YORK, ASSIGNOR TO GENERAL CHEMICAL COMPANY, OF NEW YORK, N. Y., A CORPORATION OF NEW YORK

METHOD OF CONDUCTING EXOTHERMIC GASEOUS REACTIONS

Application filed November 5, 1926. Serial No. 146,301.

My invention relates generally to improvements in the method of conducting exothermic gaseous reactions and particularly to a method of conducting the conversion of sulfur dioxide to sulfur trioxide by the well-known contact process.

In many exothermic gaseous reactions, as for example in the production of sulfur trioxide from sulfur dioxide and oxygen by the contact process, it is of vital importance to maintain exact temperature conditions throughout the reaction in order to obtain yields which are necessary to commercial success. In these reactions where a large amount of heat is developed and where the heat produces a temperature which is detrimental to the efficiency of the reaction, certain positive means for the removal of this excess heat and for the proper control of the temperature must be employed. Of the means heretofore employed the more important are the introduction of cold gases into the zone of reaction or the operation of the process under such conditions that the heated gases are continually or intermittently in heat transfer relation with a cold body. Such methods are not entirely satisfactory for numerous reasons. It is practically impossible to uniformly cool the heated gases and a heat gradient will always be found to exist between various points in the reacting gases, which prevents accurate regulation of the reaction. Furthermore, the only practicable method of cooling, i. e. by intermittent heat transfer, requires elaborate and expensive apparatus which has a vital bearing on the economic efficiency of the process.

According to my present invention I have provided a method whereby the temperature of exothermic gaseous reactions may be readily and accurately controlled. My method consists essentially in compressing the gaseous constituents prior to the initiation of the reaction, initiating the reaction, and allowing the gases to expand under controlled adiabatic conditions to produce a cooling effect proportionate to the heat developed as the reaction takes place whereby a predetermined temperature is maintained at all times throughout the reaction. The expansion of the reacting gases may occur substantially concurrently with the reaction or the reaction may be carried on in stages with intermittent cooling by expansion.

Numerous advantages which may be obtained by my invention will be apparent to one skilled in the art. By this method of temperature regulation I am able to obtain adequate control at all times of the temperature of the reacting gases. More particularly am I able to maintain uniform temperature conditions throughout the body of the reacting gases. I avoid the use of elaborate and expensive heat interchange apparatus. When carrying out gaseous reactions in which there is a decrease in the number of mols a special advantage is obtained in the form of an increased rate of reaction and a shifting of the equilibrium of the reaction towards completion, as may be expected from the law of mass action. The effect is most pronounced in the earlier stages of the reaction when the pressure is comparatively greater. Other advantages will appear in the following description of my novel method.

Figure 2:
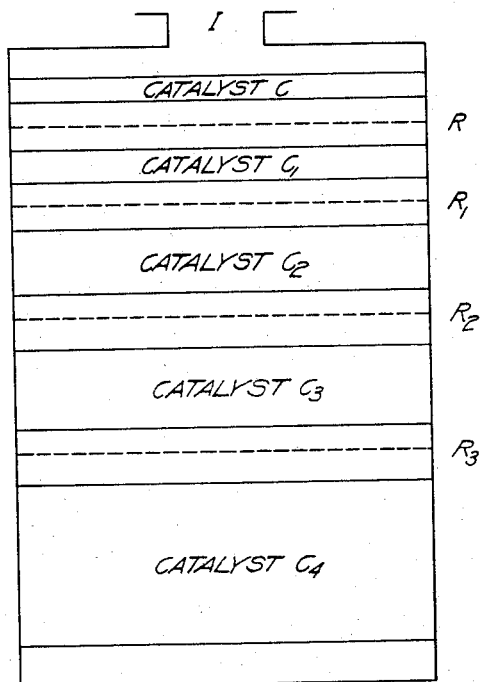

The manner in which my invention is to be performed will be described more fully with reference to the accompanying drawing in which Fig. 1 represents diagrammatically a system for conducting a gaseous reaction in several stages embodying my invention, and Fig. 2 represents diagrammatically a modified system for conducting gaseous reactions in a single chamber embodying my invention.

By way of illustrating my invention I will refer more particularly to the exothermic gaseous reaction of sulfur dioxide and oxygen to produce sulfur trioxide in the presence of a suitable catalyst, such as platinum. When sulfur dioxide is converted to sulfur trioxide by the contact process, for each one per cent of sulfur dioxide converted, sufficient heat is generated to raise the temperature of the gases approximately 60° F. This increase in temperature is highly undesirable since the equilibrium conversion is unfavorably affected, i. e. the higher the temperature the lower will be the ultimate conversion to sulfur trioxide. In order therefore to obtain high conversion it is necessary to remove this excess heat developed by the reaction. The customary method of operation has been to carry on the reaction in stages and to lower the temperature of the gases to the proper value intermediate the stages by suitable heat transfer means.

It is well known that a compressed gas when expanded adiabatically is cooled, the amount of cooling and the resulting temperature being proportional to the amount of expansion and to the original temperature of the gas. According to my invention I propose to remove this heat of reaction of sulfur dioxide and oxygen to form sulfur trioxide by adiabatically expanding the previously compressed gases, either substantially concurrently or intermittently or alternately with the conversion.

For example, a gas mixture containing 7% sulfur dioxide is to be converted to sulfur trioxide by the contact process. For most efficient conversion it is necessary to control the temperature of the reacting gases so that at the completion of conversion it will preferably not exceed 850° F. According to my invention the gas mixture, preferably cooled and after suitable purification for the subsequent conversion, is compressed. This compression may be conducted adiabatically if desired whereby the temperature of the gases is raised toward the proper temperature for the initiation of the reaction, or the gases may be compressed approximately isothermally by suitable cooling the compressor. The compressed gases are then brought to the proper temperature for the initiation of the reaction, say 700–800° F., and the heated gases introduced into the converter system.

Referring particularly to Fig. 1, the purified sulfur dioxide gas mixture is compressed in the compressor C to the desired pressure from which it passes through the preheater H where it is heated to a predetermined temperature for the initiation of the reaction. The heated compressed gases then enter the first converter A where they are partially converted to sulfur trioxide with an accompanying rise in temperature. These partially converted gases leave the converter A and pass through the expansion valve $V_1$ where the gases are expanded a predetermined amount such that the gases are again cooled to the optimum temperature for the continuation of the conversion, i. e. approximately 750–800° F. The cooled gases then pass to the converter B where the conversion of sulfur dioxide to sulfur trioxide is continued and the temperature of the gases is again raised by the heat of reaction. To remove this heat they are again expanded a predetermined amount through the valve $V_2$ and enter the third or final converter C properly cooled to the optimum temperature for the completion of the conversion. Preferably the gases will leave the converter C at approximately atmospheric pressure or slightly above, although the gases may be under considerable pressure at this point. It will be noted that the converters A, B, and C, are graduated in size, the volume capacity of the converters increasing in the successive stages and providing the necessary differential in pressure between the gases in the compressed and in the subsequently expanded condition to result in sufficient expansion to obtain the desired cooling. This feature permits a substantially uniform velocity of gases through the system as the volume of the gases increases with expansion. While the reaction is indicated as occurring in three stages, this is merely by way of example since any plurality of stages may be employed.

In Fig. 2 I have shown a modified system for carrying out my invention. This system comprises a single reaction chamber in which are disposed a plurality of resistance plates R, $R_1$, $R_2$, $R_3$, etc. The plates are provided with a plurality of orifices, the orifices of the successive plates being suitably graduated in size which will permit a predetermined expansion of the gases between the successive sections. When conducting the catalytic conversion of sulfur dioxide to sulfur trioxide in this modified system, the catalyst, for example platinized magnesium sulfate, will be disposed in layers C, $C_1$, $C_2$, $C_3$, etc. intermediate the successive plates. The previously purified compressed and preheated gas mixture containing sulfur dioxide and oxygen enters the chamber at the inlet I and contacts with the first layer of catalytic material C where partial conversion occurs with an accompanying rise in temperature of the gases. The gases then pass through the orifice in the resistance plate R whereby a predetermined expansion occurs depending on the graduated size of the orifices. This expansion cools the gases to the predetermined optimum temperature for the continuation of the conversion. The gases then pass through the catalytic material $C_1$ and subsequently through the plate $R_1$ thereby continuing the conversion and expansion. By employing a large number of alternative layers of catalyst and resistance plates, the reaction and expansion occur practically substantially concurrently so that by a proper control of the amount of expansion through each plate by graduating the size of the orifices the predetermined optimum temperature may be maintained throughout the reaction chamber. The gases, after the completion of the conversion, leave the chamber through the outlet O.

When converting a gas mixture containing approximately 7% sulfur dioxide the total heat of reaction will be found to be equivalent to approximately 400–410° F. rise in temperature. Accordingly to remove this heat it is necessary to compress the gases to a point such that upon expansion within the range of temperature of operation a cooling of 400-410° F. will be obtained. I have found that in the case of a 7% sulfur dioxide, 10% oxygen gas mixture the gases should be compressed to approximately 50 lbs. per sq. in. in order that the cooling effect by expansion of the compressed gas to atmospheric pressure may be approximately equivalent to the heating effect by the heat of reaction. Therefore if the 7% sulfur dioxide gas be compressed to approximately 50 lbs. per sq. in. prior to the initiation of the reaction, and the gas be simultaneously or alternately expanded as the conversion takes place, a substantially uniform temperature condition may be maintained throughout the conversion. It will be apparent that the larger the amount of sulfur dioxide in the gas mixture the higher will be the pressure required in order to maintain the proper temperature upon expansion. In any case, however, the approximate pressure required may be calculated by application of the well-known laws of thermodynamics.

It is known that certain reactions, particularly the catalytic conversion of sulfur dioxide to sulfur trioxide may be advantageously initiated at a higher temperature than is favorable for completion of the reaction. By my invention I am able to easily maintain optimum temperature conditions under these circumstances by compressing the gases prior to the initiation of the reaction to such a point that the cooling effect during subsequent expansion may exceed the heating effect caused by the reaction. When operating in this manner and expanding the gas as the reaction proceeds, the temperature of the system at the time the exothermic reaction is reaching completion will be less than the temperature at the initiation of the reaction, optimum temperature being thereby maintained.

As previously pointed out, my method is particularly advantageous when applied to reactions of decreasing number of mols since the increase in pressure upon the system, especially at the beginning of the reaction, exerts a strong influence toward the rapid completion of the reaction.

In the appended claims, the term "expanding the mixture during the reaction" is intended to include an expansion of the gas at any time subsequent to the initiation of and prior to the completion of the reaction.

While I have particularly described my invention with reference to the catalytic conversion of sulfur dioxide to sulfur trioxide, nevertheless the broad principles thereof are applicable to other exothermic gaseous reactions such as synthetic production of ammonia, etc., and I do not wish to limit my invention except as defined in the following claims.

I claim:
1. The method of converting sulfur dioxide to sulfur trioxide by catalytic oxidation which comprises compressing a gas containing sulfur dioxide and oxygen to a predetermined pressure, adjusting the temperature of the gases for the initiation of the conversion, initiating and continuing the conversion by contacting the gases with a suitable catalyst, and adiabatically expanding the gases during said conversion, to such an extent that a cooling effect approximately equivalent to the heating effect of the conversion is obtained.

2. The method of conducting exothermic reactions between gases which comprises causing a partial reaction in a mixture of the gases, expanding said partially reacted mixture adiabatically to bring the temperature thereof within the operative limits of said reaction, and repeating the alternate partial reaction and adiabatic expansion steps until the reaction is substantially complete.

3. The method of conducting exothermic reactions between gases which comprises causing a partial reaction in a mixture of the gases, expanding said partially reacted mixture to bring the temperature thereof within predetermined limits, and repeating the alternate partial reaction and expansion steps until the reaction is substantially complete.

4. The method of converting sulfur dioxide to sulfur trioxide by catalytic oxidation which comprises causing a partial reaction in a mixture of sulfur dioxide and oxygen, expanding said partially reacted mixture to bring the temperature thereof within predetermined limits, and repeating the alternate partial reaction and expansion steps until the reaction is substantially complete.

5. The method of converting sulfur dioxide to sulfur trioxide by catalytic oxidation which comprises causing a partial reaction in a mixture of sulfur dioxide and oxygen, expanding said partially reacted mixture adiabatically to bring the temperature thereof within the operative limits of said reaction, and repeating the alternate partial reaction and adiabatic expansion steps until the reaction is substantially complete.

In testimony whereof, I affix my signature.

CYRIL B. CLARK.